(12) United States Patent
Vanam et al.

(10) Patent No.: US 11,778,224 B1
(45) Date of Patent: Oct. 3, 2023

(54) VIDEO PRE-PROCESSING USING ENCODER-AWARE MOTION COMPENSATED RESIDUAL REDUCTION

(71) Applicant: Amazon Technologies, Inc., Seattle, WA (US)

(72) Inventors: Rahul Vanam, San Diego, CA (US); Sriram Sethuraman, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/456,766

(22) Filed: Nov. 29, 2021

(51) Int. Cl.
   *H04N 19/51* (2014.01)
   *H04N 19/176* (2014.01)
   *H04N 19/14* (2014.01)
   *H04N 19/105* (2014.01)

(52) U.S. Cl.
   CPC ........... *H04N 19/51* (2014.11); *H04N 19/105* (2014.11); *H04N 19/14* (2014.11); *H04N 19/176* (2014.11)

(58) Field of Classification Search
   None
   See application file for complete search history.

(56) References Cited

U.S. PATENT DOCUMENTS

| | | | | |
|---|---|---|---|---|
| 2007/0064816 A1* | 3/2007 | Chiang | ................ | H04N 19/61 |
| | | | | 375/E7.181 |
| 2007/0230565 A1* | 10/2007 | Tourapis | .............. | H04N 19/107 |
| | | | | 375/E7.176 |
| 2008/0062018 A1* | 3/2008 | Normile | ............... | H04N 19/164 |
| | | | | 375/E7.173 |
| 2012/0081553 A1* | 4/2012 | Cote | ........................ | G06T 5/20 |
| | | | | 348/E9.037 |
| 2018/0220129 A1* | 8/2018 | Peng | ................... | H04N 19/182 |

OTHER PUBLICATIONS

Bossen, et al. "HM Software Manual," Software AHG working document, Joint Collaborative Team on Video Coding (JCT-VC) of ITU-T SG16 WP3 and ISO/IEC JTC1/SC29/WG11, Date saved: Feb. 23, 2016, 30 pages.

Wennersten, et al., "AHG10: Encoder-only GOP-based temporal filter." Input document to JVET, Joint Video Experts Team (JVET) of ITU-T SG 16 WP 3 and ISO/TFC JTC 1/SC 29/WG 11 15th Meeting: Gothenburg, SE, Jul. 3-12, 2019, Date Saved: Nov. 29, 2021, 5 pages.

* cited by examiner

Primary Examiner — Chikaodili E Anyikire
(74) Attorney, Agent, or Firm — Weaver Austin Villeneuve & Sampson LLP (57) ABSTRACT

Techniques are described for pre-processing frames to apply a temporal filter. A P-frame may be temporally filtered based on neighboring reference frames. The temporal filter may be applied to blocks of the P-frame to improve alignment with dependent frames that are encoded based on blocks of the P-frame.

24 Claims, 4 Drawing Sheets

VIDEO PRE-PROCESSING USING ENCODER-AWARE MOTION COMPENSATED RESIDUAL REDUCTION

BACKGROUND

Video content is typically encoded and compressed prior to delivery through a network to a client device. Encoding may comprise prediction and transformation based on spatial and/or temporal similarities across frames. These techniques may reduce the file size or bitrate of the video content without significantly reducing the quality of the decoded video content.

DETAILED DESCRIPTION

This disclosure describes media content pre-processing techniques for aligning blocks of frames with neighboring frames to improve inter-frame prediction. For example, in some standards such as High Efficiency Video Coding (HEVC)/H.265, media content (e.g., movies, television shows, videos, etc.) is encoded, resulting in a compressed bitstream representing a version of that media content. The encoding process includes predicting frames based on neighboring frames. However, successive frames of a source video might be misaligned due to, e.g., the camera or objects in the frame moving. Motion vectors are typically used to map portions of a reference frame to a predicted frame. Temporal filtering may be applied to reference frames prior to encoding to better align portions of reference frames and predicted frames prior to encoding. Temporal filtering may involve determining weights to improve alignment of blocks of successive frames. As a result of this alignment, inter-frame prediction during encoding is improved, resulting in smaller residuals, and thus fewer bits, for a similar quality level. An example may be instructive.

Figure 1:
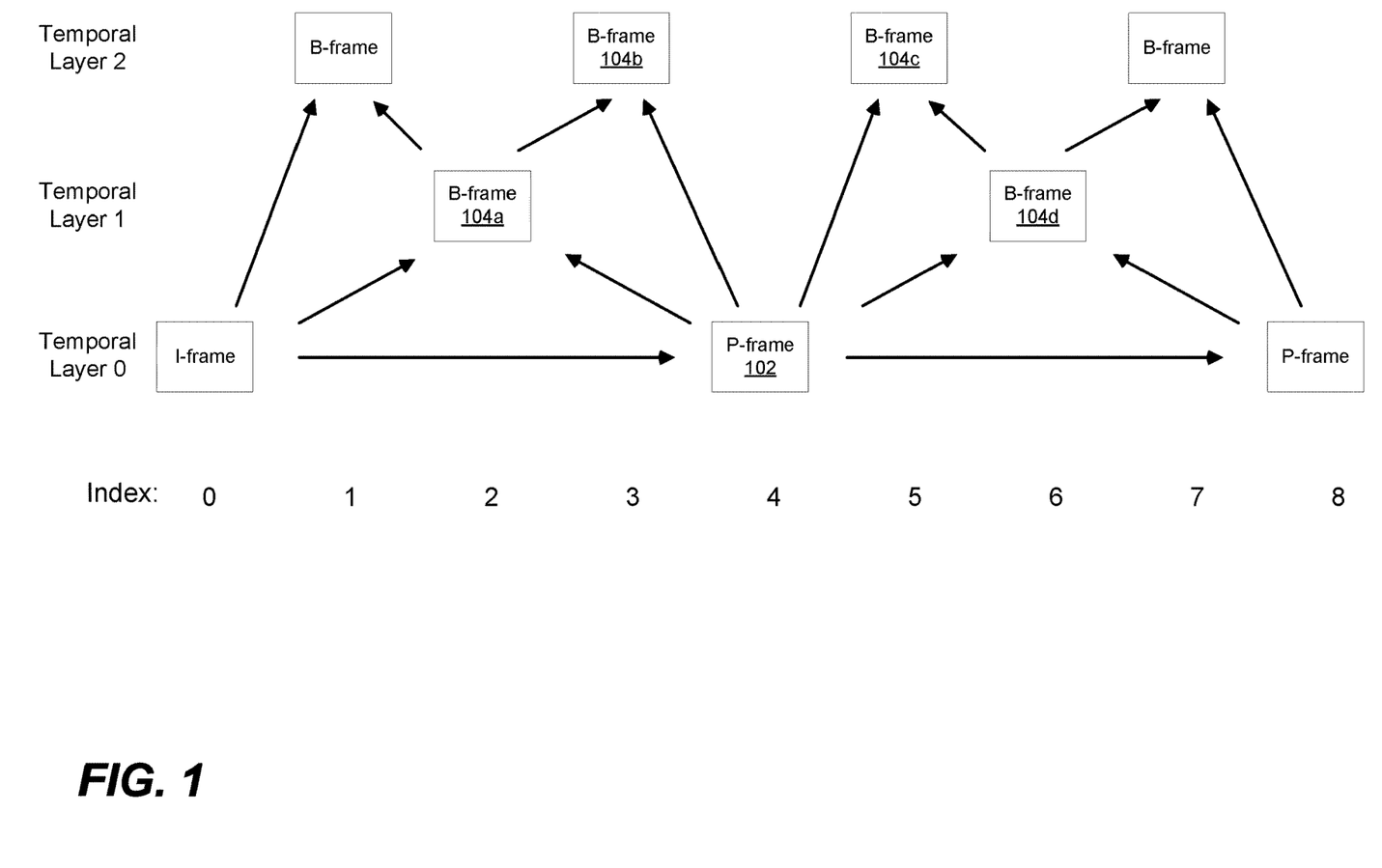
FIG. 1 presents an example of a group of pictures (GOP) that may be temporally filtered according to various embodiments described herein.

FIG. 1 presents an example encoding structure for a sequence of 9 frames. Video content may be encoded in distinct sequences of frames, where each sequence of frames may be referred to as a group of pictures (GOP). A GOP may have one or more I-frames, or intra-coded frames, which are frames that do not rely on another frame for any information. A GOP typically begins with an I-frame. A GOP may also have P-frames and B-frames. P-frames may be encoded as a prediction from a prior frame which may be either an I-frame or another P-frame. B-frames may be encoded as a prediction from prior frames, future frames, or both. In some codecs, such as High Efficiency Video Coding (HEVC)/H.265, there is a concept of temporal layers, where temporal layer 0 refers to I-frames and P-frames, while higher order layers refer to B-frames that are predicted from lower order layers. In FIG. 1, the I-frame and P-frames are part of temporal layer 0, while the B-frames are part of temporal layer 1 or temporal layer 2, depending on which frames they reference.

FIG. 1 also provides an index to indicate the display order of frames in the GOP during playback. Arrows in FIG. 1 indicate prediction; frame 0 is used for predicting frames 1, 2, and 4. The encoding or decoding order may vary from the playback order as a result of the encoding structure, e.g., frame 2 cannot be encoded until frame 4 is available and/or encoded, as frame 2 is predicted based on frame 4.

As may be understood from FIG. 1, frame 4 is a P-frame 102 that is used for predicting frames 2, 3, 5, and 6, which are B-frames 104a-d. As some of the visual content in the neighboring B-frames 104a-d may be substantially similar to visual content in P-frame 102, P-frame 102 may be compared to each B-frame to estimate a set of motion vectors defining a transformation between portions of the P-frame and that B-frame. In some implementations, the motion estimation occurs on a block basis, where a block may comprise a set of pixels, e.g., 4×4, 8×8, 16×16, or other various sizes and shapes. This motion estimation may then be used to determine a motion compensated image for each B-frame as a transformation from the P-frame (and potentially other frames). Frames used for motion estimation or filtering of a given frame may be referred to as "reference frames" of that frame. Each B-frame may be encoded using the motion vectors to represent a transformation and/or combination of blocks from reference frames. In some implementations, a residual difference is determined between a block of the B-frame and a block from one of the reference frames, and that residual difference is encoded along with the motion vectors. Motion vectors and residuals improve compression by reusing image data encoded in the reference frames.

As B-frames 104a-d have substantially similar to visual content in P-frame 102, aligning P-frame 102 with B-frames 104a-d prior to encoding may improve the encoding of B-frames 104a-d. Thus, to further improve encoding efficiency, P-frame 102 may be temporally filtered to align it with the B-frames 104a-d, improving inter-frame prediction and reducing the residual values across all of the B-frames. P-frame 102 may be temporally filtered prior to encoding, such that the filtered values are used for encoding the B-frames. As the filtered values of blocks in P-frame 102 are closer to the values in corresponding blocks of B-frames 104a-d, the encoding of B-frames 104a-d may be more efficient, reducing the bitrate for a similar quality level.

Figure 2:
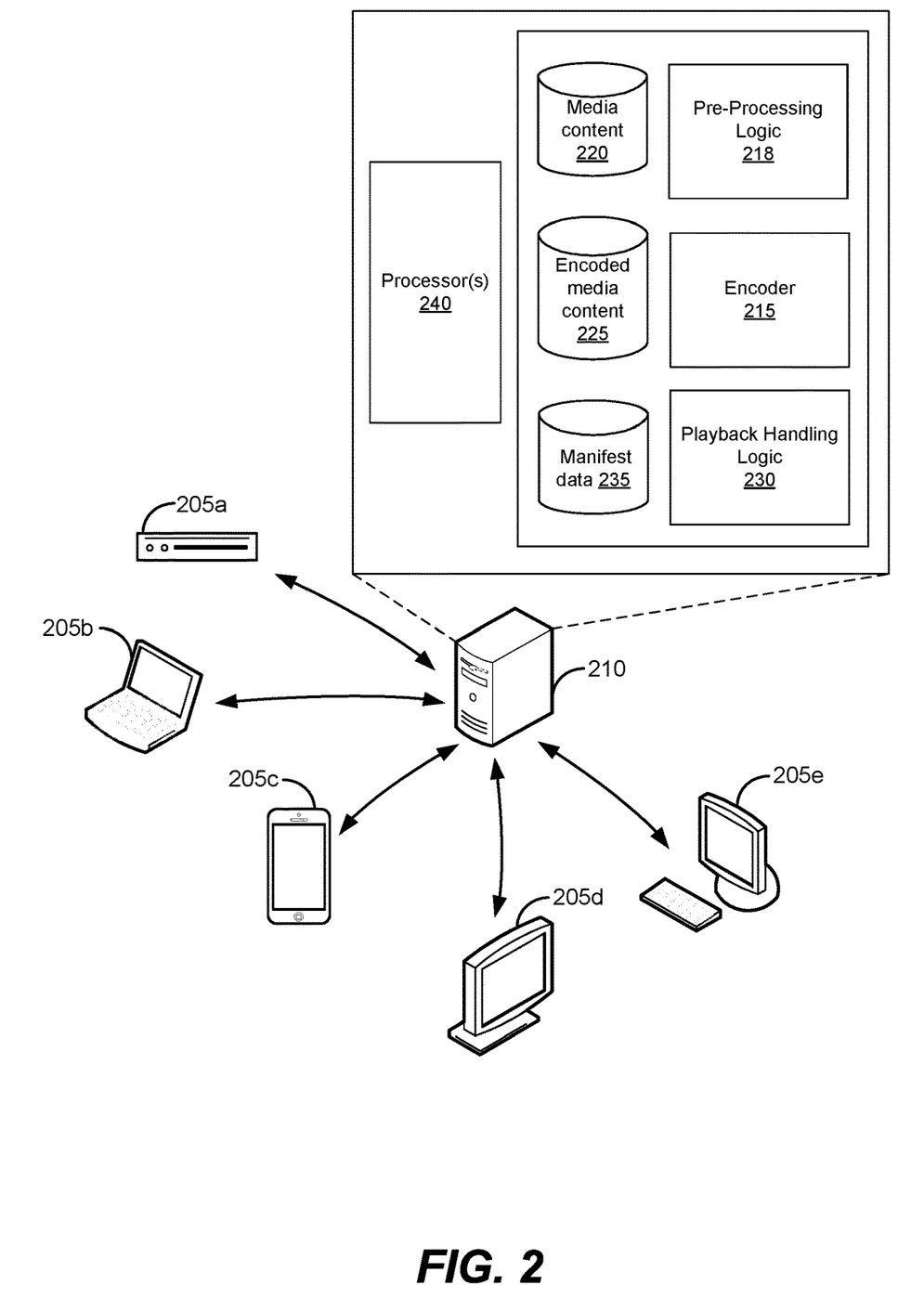
FIG. 2 presents an illustration of an example of pre-processing and encoding media content.

FIG. 2 illustrates an example of a computing environment for encoding media content. The computing environment of FIG. 2 includes media server 210 which can be used to encode and provide media content to viewer devices 205a-e. Viewer devices 205a-e can decode the encoded media content for playback on a display screen. In FIG. 2, viewer device 205a is a set-top box, viewer device 205b is a laptop computer, viewer device 205c is a smartphone, viewer device 205d is a television, and viewer device 205e is a desktop computer. However, related functionality may also be implemented within tablets, wearable devices, virtual or augmented reality headsets, video game consoles, etc.

Media server 210 can conform to any of a wide variety of architectures and its functionality may be implemented by a variety of servers. For example, one server might encode media content and the encoded media content might be provided to another server, for example, belonging to a content delivery network (CDN). As such, the functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer devices 205a-e), integrated into a separate app from another entity, implemented in an edge server or content server of a CDN, a server of an ISP, etc.

It should be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

In FIG. 2, media server 210 can include various types of logic used to implement encoder 215 to encode media content stored in media content 220 and store encoded media content in memory such as encoded media content 225, as well as playback handling logic 230 to provide requested manifest files from manifest data 235 to viewer devices 205a-e so that they can request the encoded media content for playback. Media server 210 can include pre-processing logic for determining temporally filtered frames prior to encoding. Media server 210 can include one or more processors 240, memory, and other hardware components to encode media content and provide the encoded media content to viewer devices 205a-e. For example, processors 240 can execute stored instructions in memory of media server 210 to implement encoding techniques disclosed herein.

Viewer devices 205a-e can also include various types of logic used to implement a decoder to decode the encoded media content received from media server 210 and store the decoded media, as well as playback handling logic to request manifest files and store the manifest files, and request fragments of the encoded media content based on the manifest files. Viewer devices 205a-e can include one or more processors, memory, and other hardware components to request and decode the encoded media content provided by media server 210. For example, the processors of viewer devices 205a-e can execute stored instructions in memory of the corresponding viewer device to implement decoding techniques based on the encoding techniques disclosed herein.

Figure 3:
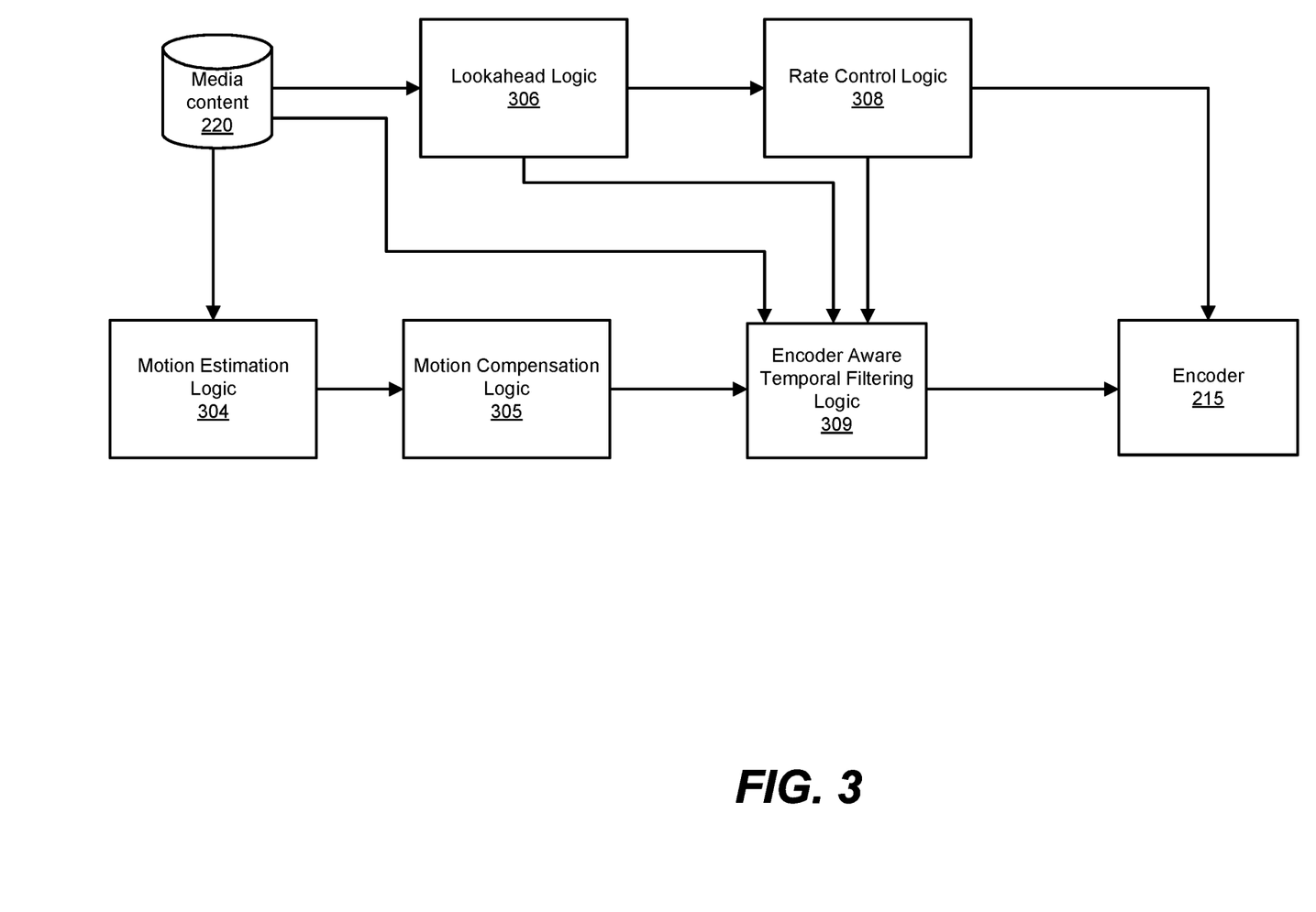
FIG. 3 presents a block diagram of an implementation of an encoder-aware temporal filter according to various embodiments herein.

A specific implementation will now be described with reference to FIG. 1, the computing environment of FIG. 2, the block diagram of FIG. 3 the flow diagram of FIG. 4. FIG. 3 presents a block diagram of encoder-aware temporal filtering. Media content 220 may be processed by motion estimation logic 304 and motion compensation logic 305 to identify motion vectors and motion compensated blocks, respectively. Lookahead logic 306 and rate control logic 308 may determine quantization parameters or frame types for frames of the media content (e.g., which frames will be encoded as I-frames, P-frames, or B-frames). Generally, lookahead logic and rate control logic may analyze the frames to determine a complexity of the frames and thus the quantization parameter to use. Encoder-aware temporal filtering logic 309 may determine various filter weights as well as the temporally filtered frames prior to providing the temporally filtered frame to encoder 215. In some embodiments, one or more of logic 304, 305, 306, 308, and 309 may be part of pre-processing logic 218. In some embodiments one or more of logic modules may be part of the encoder, e.g., motion estimation logic 304 and motion compensation logic 305.

Figure 4:
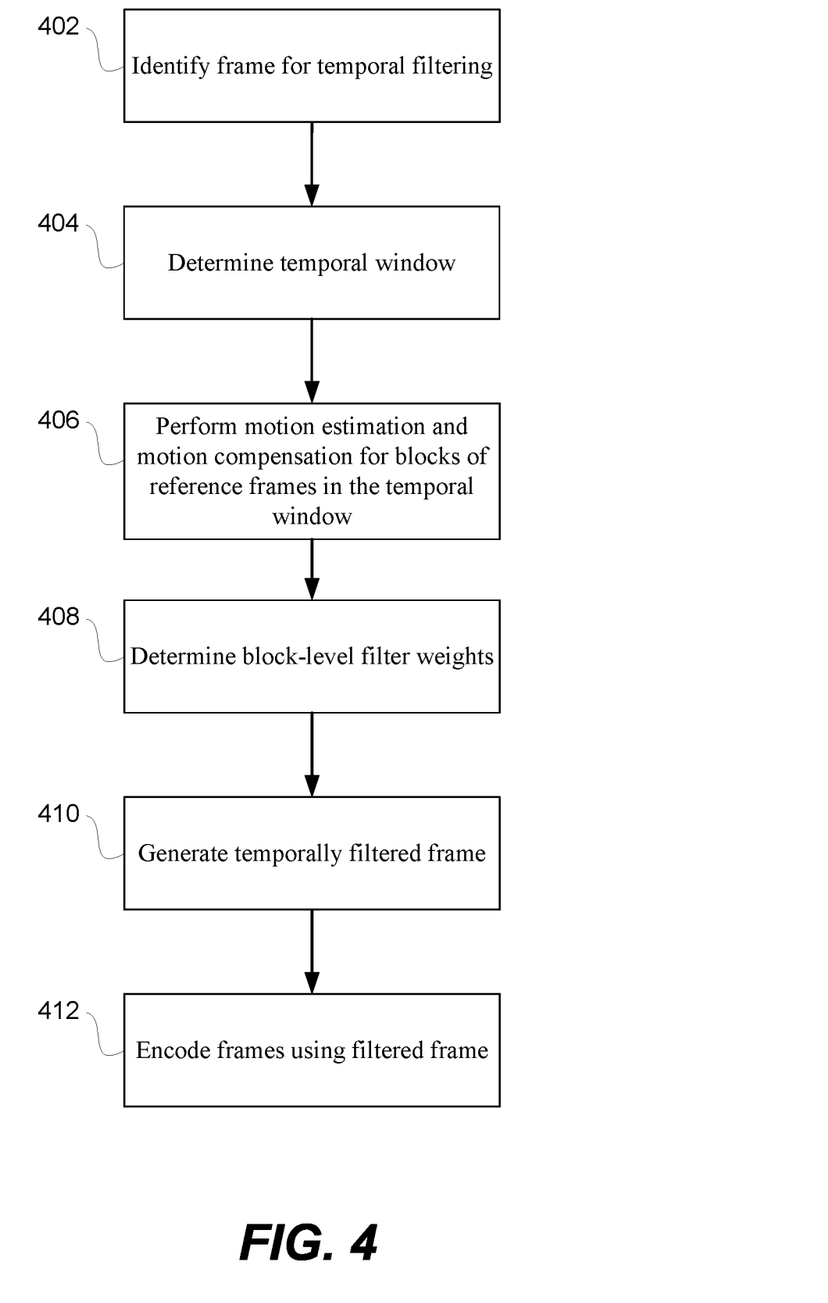
FIG. 4 presents a flowchart illustrating an example of temporally filtering a frame.

In FIG. 4, pre-processing logic 218 of media server 210 identifies an image frame for temporal filtering (402). In some embodiments, image frames for temporal filtering are layer 0 frames, such as P-frames or I-frames.

A temporal window is determined based on the current frame for temporal filtering (404). The temporal window may include one or two frames behind and in front of the current frame to be temporally filtered. These frames are the reference frames for temporal filtering. For example, assuming the current frame is frame t, the temporal window may include frame t−2, t−1, t, t+1, and t+2. As shown in FIG. 1, a P-frame may generally have neighboring B-frames that are predicted from the P-frame, such that two frames behind and in front of the current frame are B-frames that are predicted from the current frame.

In some implementations, the temporal window for a frame or block may be determined based on an extent that the block is used for predicting blocks in other frames. For example, in some implementations, the encoder may be enabled to adaptively place P-frames and B-frames without adhering to a fixed GOP structure. This may generally improve compression by allowing the encoder to place successive P-frames in a sequence with large amounts of motion between frames. However, in such implementations P-frames may be placed in succession or within two frames of each other. Successive P-frames may indicate a large amount of motion between such frames, such that blocks in prior P-frames or I-frames may not be as useful for predicting such frames (if they were, then the frame succeeding a P-frame would typically be a B-frame). In implementations where the t−2 or t+2 frame is a P-frame, the temporal window may be adjusted to only include one frame behind and one frame in front of the current frame, excluding P-frames (or I-frames). As P-frames may be used when large amounts of motion are present, temporally filtering a P-frame based on another P-frame may not sufficiently reduce compression costs, and thus the temporal window size may be adjusted to exclude the neighboring P-frame. Generally, temporal filtering performs better when there is a high amount of similarity between all of the frames in the temporal window. In some implementations, the temporal window size may be adjusted symmetrically, such that if the t−2 frame is a P-frame, the temporal window size is reduced to adjacent frames only, even if the t+2 frame is a B-frame. In other implementations, the temporal window size may be adjusted asymmetrically.

In some implementations, if the current frame is adjacent to a P-frame, temporal filtering may not be used for the current frame (and, likewise, the adjacent P-frame may not be temporally filtered). In such implementations, the neighboring frames may be encoded without temporal filtering as described herein for the current frame. It should be understood that a future P-frame may be temporally filtered, such that a B-frame may depend from a first P-frame that is not temporally filtered and from a second P-frame that is temporally filtered.

Alternatively or in addition to the above, the extent that a block is used for predicting blocks in other frames may be based on a coding unit propagation cost. In some standards such as HEVC/H.265, an image frame is segmented into coding tree units (CTUs) which can be further partitioned into coding units (CUs) for different portions of the image frame. Different CUs in the image frame can be different sizes, for example, some might be a 4×4 block of pixels, some might be 8×8 pixels, and so forth up to 64×64 pixels. The CU-tree propagation cost of a block indicates how frequently the block is used as a reference for prediction by other frames during encoding. Blocks that are frequently being referenced have a large CU-tree propagation cost.

In some implementations this cost may be used to determine the size of the temporal window. In some implementations, the CU-tree propagation cost may be determined by analyzing a set of frames after the current frame. Some blocks may not be frequently used for prediction compared to other blocks in the current frame, based on, e.g., fast vs. slow motion, the CU-tree propagation cost may indicate if a block is short lived. In some embodiments, this is done by the encoder and derived by a lookahead logic that is encoder-aware. The encoder may determine a propagation cost for the block based on how often it is referenced by adjoining blocks. In some embodiments, the CU-tree propagation cost is based on the next 30 frames. In some embodiments, the CU-tree propagation cost is based on the succeeding frames in the GOP.

In some implementations, multiple thresholds may be empirically derived to determine the size of the temporal window. In one embodiment, there may be a first threshold and a second threshold, where the second threshold is greater than the first threshold. If the propagation cost of a block is less than the first threshold, the temporal window may be set to zero, effectively disabling the temporal filter. If the propagation cost is higher than the first threshold but less than the second threshold, the temporal window may only include the t−1 and t+1 blocks, effectively shrinking the size of the temporal window for that block. If the propagation cost is equal or larger than the second threshold, the temporal window is not changed. In some embodiments this may be performed on a per block basis, such that a first block in a first frame may have a different temporal window size than a second block in the first frame, based on an extent that the first block and the second block are used to determine for predicting blocks in other frames.

After determining the temporal window, motion estimation and motion compensation is applied to the reference frames to determine motion compensated blocks from each reference frame to the current frame (406). Motion estimation involves generating motion vectors for blocks in each reference frame that correspond to a block in the current frame. Various techniques may be used for motion estimation. Generally, a frame is divided into blocks having a specific size and shape, such as 8×8 blocks (though other shapes and sizes may be used, e.g., 4×4, 16×16, 4×8, etc.). Motion estimation may identify a closest matching block between the current frame and a reference frame (which may also be repeated for each reference frame). Matching may be based on minimizing a sum of square difference between the P-frame block and the reference frame blocks. Once two matching blocks are identified, motion vectors for transforming the block in the reference image to the same location as the block in the current image are determined. These motion vectors may be used to generate a motion compensated frame associated with each reference frame.

In some implementations the motion of objects between a block of the current frame and a block of a reference frame is less than a full pixel. In such embodiments motion compensation may involve determining a fractional pixel, such as ¼, ⅛, or 1/16pixel accuracy. At fractional accuracy, there is no physical pixel, so the fractional pixel is interpolated according to various techniques.

In some embodiments, motion estimation may be performed using hierarchal motion estimation. In some implementation, a Gaussian pyramid with three hierarchal layers may be used. A hierarchal motion estimation scheme generally involves subsampling or averaging the image frame to generate a smaller image frame, once for each layer (one layer is the original image). A search may then be performed using the smaller image, where the best motion vector is then scaled for the larger layers to further refine the motion vector. In some embodiments, motion estimation may be performed using a search window of 3×3 at the smallest layer.

In a Gaussian pyramid, a sub-sampled frame may be generated by using a Gaussian low-pass anti-aliasing filter. Compared to a 2×2 uniform averaging kernel, Gaussian filtering may generate more accurately filtered pixels at each sub-sampled position. Therefore, when motion estimation is performed across sub-sampled frames, the Gaussian sub-sampled frames may be used to determine more accurate motion vectors compared to uniform averaged frames.

Furthermore, the motion search range may be reduced as a better matched block is more efficiently determined. Since motion vectors with higher accuracy are generated at lower resolution layers by a Gaussian filter, they serve as better motion vector candidates for motion estimation in higher resolution layers. Therefore, a smaller number of candidate motion vectors neighboring the best motion vectors from the lower resolution layer can be evaluated at the higher resolution layer while maintaining performance.

The current frame blocks and the motion compensated blocks of the reference frames are used to determine block-level filter coefficients (408). EQ 1 describes a luma filter weight for a motion compensated block:

$$w_r(i, a, b) = s_{var}(b)s_w(i, c)s_l s_0(n) s_r(i, a) e^{-\frac{MSE_b(i)^2}{\sigma_l^2(QP)^2}} \quad \text{(EQ 1)}$$

Where i refers to a particular reference frame, a is the total number of reference frames used for temporal filtering, and b is the block of the current frame being temporally filtered. EQ 1 may determine weights for each motion compensated block for the luma component. It should be understood that EQ 1 applies weights on a block level, such that all pixel values in the block have the same weight applied to them. The filter weight of EQ 1 is applied to the luma component of pixels during encoding. A similar chroma filter weight (which is similarly applied to the chroma components of pixels) may be expressed as:

$$w_r(i, a, b) = s_{var}(b)s_c s_0(n) s_r(i, a) e^{-\frac{MSE_b(i)^2}{2\sigma_c^2}}$$

In some embodiments, one coefficient of EQ 1 is based on the mean squared error (MSE) of the current block b and a corresponding motion compensated block in a reference frame i. Each of the pixel values in the current block and the motion compensated block of reference frame i are compared to generate a MSE on a block level. Notably, the MSE is calculated based on individual pixel values, but is applied at a block level to reduce complexity of the weighting calculation.

In some embodiments, one weight is the quantization parameter (QP). Temporal filtering may use block-level quantization parameters (QPs) that are derived in a lookahead and rate control stage of the encoder for deriving filter coefficients. As noted above, lookahead logic and rate control logic may analyze the frames to determine a complexity of the frames and thus the quantization parameter to use. More complex frames and/or blocks, e.g., blocks having higher spatial or temporal complexity, may have a lower quantization parameter to preserve more details of the encoded content. Less complex frames and/or blocks, e.g., blocks that have high spatial or temporal redundancy, may have a higher quantization parameter. Using different quantization parameters for different complexity blocks may allow for a more consistent quality of the decoded content, as more complex blocks using a higher quantization parameter may preserve more detail than less complex blocks using a lower quantization parameter. Generally, quantization parameters may be selected based on a complexity of the block as well as a desired bitrate or quality level. A higher quality level may decrease the quantization parameter, and a lower bitrate may increase the quantization parameter. Various techniques may be used for selecting quantization parameters as part of an encoding process.

Thus, in some implementations the lookahead stage is operated first on the original frames, and temporal filtering is applied to a given frame just before it can be encoded. FIG. 3 illustrates temporal filtering when used with the lookahead stage of the encoder. In some embodiments, the QP used for temporal filtering of a block is based on the QP that is to be used when encoding that block. Thus, the QPs for each motion compensated block may be different, as each QP is based on the QP that the lookahead logic determines will be used during encoding. Using the QP determined by the rate control logic may improve the temporal filtering as the QP used for the weights in temporally filtering a block is the QP used for encoding that block.

In some embodiments, one weight is based on an extent that the block is used for predicting blocks in other frames, such as a coding unit (CU)-tree propagation cost for a block in the current frame ($s_w(i,c)$). The CU-tree propagation cost may be determined using methods as discussed above. Various techniques may be used for determining a weight based on the CU-tree propagation cost. In some implementations, multiple thresholds may be empirically derived to determine weights. As noted above, such thresholds may be used to determine a size of the temporal window based on the CU-tree propagation cost. Alternatively, a weight may be based on the thresholds, where a weight of zero indicates that the motion compensated block is skipped and does not contribute to the filtered frame.

In some implementations, a logistic function may be used instead of thresholds. The following logistic function may be used:

$$f(x) = \frac{L}{1 + \exp(-k(x - xo))}$$

Where L, k, and $x_o$ are parameters, and x is the CU-tree propagation cost. For reference frames belonging to (t−1) and (t+1) the following Logistic function is used:

$$f_1(x) = f(x)_{L=1, xo=10, k=0.3}$$

For reference frames belonging to (t−2) and (t+2) we use the following Logistic function:

$$f_2(x) = \min(f_1(x), f(x)_{L=1, xo=10, k=0.8})$$

Values for the parameters may be determined heuristically. Generally, $f_1(x)$ saturates to a maximum weight of 1 faster than $f_2(x)$. Thus, if the propagation cost is relatively high (e.g., greater than 100), indicating the block of the current frame is highly referenced, the weights for the motion compensated blocks of all reference frames will be 1. Otherwise, blocks of the adjacent frame will have a higher weight than t+2 and t−2 frame blocks. Thus, referring back to EQ 1, $s_w(i,c)$ may be defined by $s_w(i,c) = f_{|i|}(c)$, where $f_{|i|}$ refers to the equations for $f_1$ and $f_2$, above.

In some implementations, one weight is the variance of a block ($s_{var}(b)$). Blocks with large spatial complexity or variance (e.g. blocks with textures, edges, etc.) may yield a high MSE or pixel difference with its neighboring motion compensated blocks, since textures between neighboring frames may not match perfectly. This may cause the weights in EQ 1 to penalize such blocks by assigning lower weights. Thus, in some implementations, the local variance of the current block (e.g. 4×4) is computed and the block is assigned an adaptive weight based upon the variance. The variance may be computed using various techniques known in the art, including normal or Gaussian variance. For larger variance, a higher weight may be used. For example, there may be a first threshold and a second threshold greater than the first threshold. If the variance is below the first threshold, the weight may be less than 1. If the variance is above the second threshold, the weight is greater than 1. If the variance is between the first threshold and the second threshold, the weight is set to 1. The thresholds of variance and their associated block weights may be empirically determined. A weight greater than 1 may be assigned to account for the current block having a high variance, and thus seeming to be a poor match to the motion compensated blocks, despite actually being a better match than such weights may imply.

In some embodiments, the weight for variance may be set according to the following equation:

$$s_{var} = y * \exp\left(\frac{-1}{1 + \sigma^2}\right), \text{ where } y \geq 1$$

Other weights shown in EQ 1 may be determined according to the following:

$$s_r(i, 2) = \begin{cases} 1.2, & i = 0 \\ 1.0, & i = 1 \end{cases}$$

$$s_r(i, 4) = \begin{cases} 0.60, & i = 0 \\ 0.85, & i = 1 \\ 0.85, & i = 2 \\ 0.60, & i = 3 \end{cases}$$

$s_r(i,a) = 0.3$ for $a = 1, 3$.

$s_1 = 0.4$

In some embodiments, $\sigma'_i(QP) = (QP - 10)$, where QP is based on the QP for that block determined by the rate control and look ahead modules.

$s_0(n)$ is a temporal layer weight. This is typically set to a higher valuer for lower temporal layers, e.g., for temporal layer 0 $s_0(n)$ is 1.5, temporal layer 1=0.95. As lower layers are encoded with lower QPs and serve as a reference to higher layers during prediction, lower layer frames may have a higher weight.

$s_1$, $s_c$ are an overall weight factor of the motion compensated reference frames to temporal filtering. A weight closer to one would yield stronger temporal filtering. $s_1$ is for luma weighting, while $s_c$ is for chroma weighting.

$s_r$ is a weight associated with distance of a reference frame from the current frame. Motion compensated reference frames that are temporally closer to a current frame may be assigned a higher weight, as such frames typically have a higher correlation to the current frame.

In some implementations, the filter weights are determined for the same block size as the motion compensated blocks. For example, if an 8×8 block of the current frame is used to determine motion compensated blocks in the reference frames, the filter weights may also be determined for that 8×8 block. In some implementations, the filter weights and the motion estimation/compensation are determined for different sized blocks, e.g. a sub-block of a block. For example, if an 8×8 block of the current frame is used to determine motion compensated blocks in the reference frame, the filter weights may be determined based on 4×4 sub-blocks of that block. Other sizes of blocks and sub-blocks may be used. In some implementations, the filter weights are determined for sub-blocks of a block that is motion compensated. In some implementations, motion compensation is determined for sub-blocks of a block for which filter weights are determined. In some implementations, motion estimation is performed on a block level, while filter weights are applied at a pixel level, e.g., rather than a block level mean squared error, the squared error between individual pixels is used as a weight. In some implementations, motion estimation may be performed at a pixel level (e.g., optical flow, where each pixel in a block has a distinct motion vector), and the filter weights are determined at a block level. In some implementations, all of the filter weights are determined at the same block size or for individual pixels. In some implementations, one or more of the filter weights may be determined for a block size that is larger or smaller than the block size used for other weights (including at a block size of 1, e.g. a pixel). For example, squared error may be determined for each pixel, while variance and/or CU-tree propagation cost are determined for a 4×4 block including that pixel. It should be understood that different block sizes and sub-block sizes may be used in accordance with this disclosure, e.g., 4×4, 16×16, 4×8, etc.

A temporally filtered frame is generated based on the filter weights, the motion compensated blocks of reference frames, and the current frame (410). EQ 1 defines a luma filter weight for each motion compensated block of each reference frame, and a corresponding chroma filter weight may also be determined. The weighted motion compensated blocks and the block of the current frame may then be combined to generate a filtered block. In some embodiments, the filtered block is then encoded and reconstructed. For example, as higher temporal layer frames are encoded based on predictions from lower temporal layer frames, the lower temporal layer frames may be initially encoded. The lower temporal layer frames may then be reconstructed for predicting the higher temporal layer frames. Thus, the filtered block may be encoded and reconstructed. This filtered and reconstructed block may then be used during encoding (412). As noted above in FIG. 1, B-frames 104a-d are encoded in part based on P-frame 102. As a result of techniques described herein, blocks 104a-d may instead be encoded based on a temporally filtered P-frame 102, such that P-frame 102 is more closely aligned with B-frames 104a-d, resulting in a more efficient encoding and compression.

CONCLUSION

Although the foregoing embodiments have been described in some detail for purposes of clarity of understanding, it will be apparent that certain changes and modifications may be practiced within the scope of the appended claims. Embodiments disclosed herein may be practiced without some or all of these specific details. In other instances, well-known process operations have not been described in detail to not unnecessarily obscure the disclosed embodiments. Further, while the disclosed embodiments will be described in conjunction with specific embodiments, it will be understood that the specific embodiments are not intended to limit the disclosed embodiments. It should be noted that there are many alternative ways of implementing the processes, systems, and apparatus of the present embodiments. Accordingly, the present embodiments are to be considered as illustrative and not restrictive, and the embodiments are not to be limited to the details given herein.

What is claimed is:

1. A method, comprising:
   receiving a sequence of frames;
   identifying a first block in a first frame of the sequence of frames;
   determining an extent that the first block is used for predicting blocks in other frames, wherein the extent that the first block is used for predicting blocks in other frames is based at least in part on a neighboring P-frame or I-frame;
   identifying a temporal window of frames based on the extent that the first block is used for predicting blocks in other frames, wherein the temporal window comprises the first frame and the other frames in the temporal window are not P-frames or I-frames;
   determining one or more motion compensated blocks in corresponding one or more frames within the temporal window of frames;
   determining a mean squared error between the first block and each of the one or more motion compensated blocks;
   determining a quantization parameter of the first block;
   determining a variance of the first block;
   generating a filtered first block based on the first block, one or more motion compensated blocks, the mean squared error, the quantization parameter, and the variance;
   encoding the filtered first block in the first frame to generate an encoded first block;
   generating a filtered and reconstructed first block based on the encoded first block; and
   encoding the one or more frames neighboring the first frame in the temporal window of frames based at least in part on the filtered and reconstructed first block.

2. The method of claim 1, further comprising performing motion estimation for the first block with the frames in the temporal window to identify the one or more reference blocks.

3. The method of claim 1, wherein the temporal window of frames comprises the two frames before and the two frames after the first frame.

4. The method of claim 1, wherein the first frame is an I-frame or a P-frame.

5. A method, comprising:
receiving a sequence of frames;
identifying a first block in a first frame of the sequence of frames;
determining an extent that the first block is used for predicting blocks in other frames, wherein the extent that the first block is used for predicting blocks in other frames is based at least in part on a neighboring P-frame or I-frame;
identifying a first temporal window of frames based on the extent that the first block is used for predicting blocks in other frames, wherein the first temporal window comprises the first frame and the other frames in the temporal window are not P-frames or I-frames;
identifying one or more reference blocks in frames within the first temporal window that correspond to the first block;
determining a first set of filter weights associated with the first block;
generating a filtered first block based on the first block, the one or more reference blocks, and the first set of filter weights;
generating an encoded first block based on the filtered first block;
generating a filtered and reconstructed first block based on the encoded first block; and
encoding the one or more frames neighboring the first frame in the first temporal window based at least in part on the filtered and reconstructed first block.

6. The method of claim 5, further comprising performing motion estimation for the first block with the frames in the first temporal window to identify the one or more reference blocks.

7. The method of claim 5, wherein the first temporal window comprises the two frames before and the two frames after the first frame.

8. The method of claim 5, wherein the first set of filter weights comprise a mean squared error between the first block and each of the one or more reference blocks.

9. The method of claim 5, wherein a filter weight of the first set of filter weights is based on a quantization parameter associated with the first block.

10. The method of claim 9, further comprising determining the quantization parameter based on a complexity of the first block.

11. The method of claim 5, further comprising determining a variance of the first block, wherein a filter weight of the first set of filter weights is based on the variance of the first block.

12. The method of claim 5, wherein a subset of the first set of filter weights is associated with a first reference block of the one or more reference blocks, and wherein the method further comprises generating the filtered first block based at least in part on applying the subset of the first set of filter weights to each pixel value in the first reference block.

13. The method of claim 5, further comprising:
identifying a second frame in the sequence of frames, wherein the second frame is part of a temporal layer;
determining that a neighboring frame is part of the same temporal layer; and
identifying a second temporal window such that the neighboring frame is not part of the second temporal window.

14. The method of claim 5, further comprising:
identifying a second block in the first frame;
identifying a second set of one or more blocks in frames within the first temporal window that correspond to the second block;
determining a second set of filter weights associated with the second block, wherein the second set of filter weights are different from the first set of filter weights;
generating a filtered second block based on the second block, the second set of one or more blocks, and the second set of filter weights; and
generating an encoded second block based on the filtered second block;
generating a filtered and reconstructed second block based on the encoded second block; and
encoding the one or more frames neighboring the first frame in the first temporal window based at least in part on the filtered and reconstructed second block.

15. A system, comprising one or more processors and one or more memories configured for:
receiving a sequence of frames;
identifying a first block in a first frame of the sequence of frames, wherein the extent that the first block is used for predicting blocks in other frames is based at least in part on a neighboring P-frame or I-frame;
determining an extent that the first block is used for predicting blocks in other frames;
identifying a first temporal window of frames based on the extent that the first block is used for predicting blocks in other frames, wherein the first temporal window comprises the first frame and the other frames in the temporal window are not P-frames or I-frames;
identifying one or more reference blocks in frames within the first temporal window that correspond to the first block;
determining a first set of filter weights associated with the first block;
generating a filtered first block based on the first block, the one or more reference blocks, and the first set of filter weights;
generating an encoded first block based on the filtered first block;
generating a filtered and reconstructed first block based on the encoded first block; and
encoding the one or more frames neighboring the first frame in the first temporal window based at least in part on the filtered and reconstructed first block.

16. The system of claim 15, wherein the one or more processors and one or more memories are further configured for performing motion estimation for the first block with the frames in the first temporal window to identify the one or more reference blocks.

17. The system of claim 15, wherein the first temporal window comprises the two frames before and the two frames after the first frame.

18. The system of claim 15, wherein the first set of filter weights comprise a mean squared error between the first block and each of the one or more reference blocks.

19. The system of claim 15, wherein a filter weight of the first set of filter weights is based on a quantization parameter associated with the first block.

20. The system of claim 19, wherein the one or more processors and one or more memories are further configured for determining the quantization parameter based on a complexity of the first block.

21. The system of claim 15, wherein the one or more processors and one or more memories are further configured for determining a variance of the first block, wherein a filter weight of the first set of filter weights is based on the variance of the first block.

22. The system of claim 15, wherein a subset of the first set of filter weights is associated with a first reference block of the one or more reference blocks, and wherein the one or more processors and one or more memories are further configured for generating the filtered first block based at least in part on applying the subset of the first set of filter weights to each pixel value in the first reference block.

23. The system of claim 15, wherein the one or more processors and one or more memories are further configured for:
   identifying a second frame in the sequence of frames, wherein the second frame is part of a temporal layer;
   determining that a neighboring frame is part of the same temporal layer; and
   identifying a second temporal window such that the neighboring frame is not part of the second temporal window.

24. The system of claim 15, wherein the one or more processors and one or more memories are further configured for:
   identifying a second block in the first frame;
   identifying a second set of one or more blocks in frames within the first temporal window that correspond to the second block;
   determining a second set of filter weights associated with the second block, wherein the second set of filter weights are different from the first set of filter weights;
   generating a filtered second block based on the second block, the second set of one or more blocks, and the second set of filter weights; and
   generating an encoded second block based on the filtered second block;
   generating a filtered and reconstructed second block based on the encoded second block; and
   encoding the one or more frames neighboring the first frame in the first temporal window based at least in part on the filtered and reconstructed second block.

* * * * *